United States Patent
Fukui

(10) Patent No.: US 7,817,507 B2
(45) Date of Patent: Oct. 19, 2010

(54) OPTICAL DISK DEVICE PERFORMING HIGH-SPEED SEEK OPERATION AND OPTICAL DISK DEVICE SEEKING METHOD

(75) Inventor: Toshiaki Fukui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 739 days.

(21) Appl. No.: 11/809,733

(22) Filed: Jun. 1, 2007

(65) Prior Publication Data

US 2007/0280063 A1 Dec. 6, 2007

(30) Foreign Application Priority Data

Jun. 2, 2006 (JP) .............................. 2006-154969

(51) Int. Cl.
G11B 7/00 (2006.01)
G11B 0/85 (2006.01)
(52) U.S. Cl. .................................. 369/44.28; 369/30.1
(58) Field of Classification Search ............. 369/44.28, 369/44.29, 44.32, 44.27, 30.1, 53.2, 44.35
See application file for complete search history.

(56) References Cited

U.S. PATENT DOCUMENTS 6,970,403 B2 * 11/2005 Kadlec et al. ............ 369/44.29
7,196,979 B2 * 3/2007 Kadlec et al. ............ 369/44.27

FOREIGN PATENT DOCUMENTS

| JP | 8-124177 | 5/1996 |
|---|---|---|
| JP | 10-334480 | 12/1998 |
| JP | 2003-22632 | 1/2003 |
| JP | 2005-18873 | 1/2005 |
| JP | 2005-216332 | 8/2005 |

OTHER PUBLICATIONS

Patent Abstracts of Japan for Japanese Publication No. 2005-216332, Publication date Aug. 11, 2005 (1 page).
Patent Abstracts of Japan for Japanese Publication No. 2005-018873, Publication date Jan. 20, 2005 (1 page).
Patent Abstracts of Japan for Japanese Publication No. 08-124177, Publication date May 17, 1996 (1 page).
Japanese Office Action for Japanese Application No. 2006-154969, mailed on Apr. 15, 2008 (6 pages).
Patent Abstracts of Japan for Japanese Publication No. 2003-022632, Publication date Jan. 24, 2003 (1 page).
Patent Abstracts of Japan for Japanese Publication No. 10-334480, Publication date Dec. 18, 1998 (1 page).

* cited by examiner

*Primary Examiner*—Ali Neyzari
(74) *Attorney, Agent, or Firm*—Osha Liang LLP

(57) ABSTRACT

When a remaining number of tracks is smaller than a first threshold value, a coarse seek operation is determined to be normal, and therefore, a learning process is not executed. If the remaining number of tracks is not smaller than a second threshold value, the coarse seek operation is determined to be abnormal, and a voltage learning process id executed. If the remaining number of tracks is not smaller than the first threshold value and smaller than the second threshold value and prescribed conditions are satisfied, the operation is determined to be abnormal, and a time learning process is executed.

5 Claims, 5 Drawing Sheets t0 t0  t0#

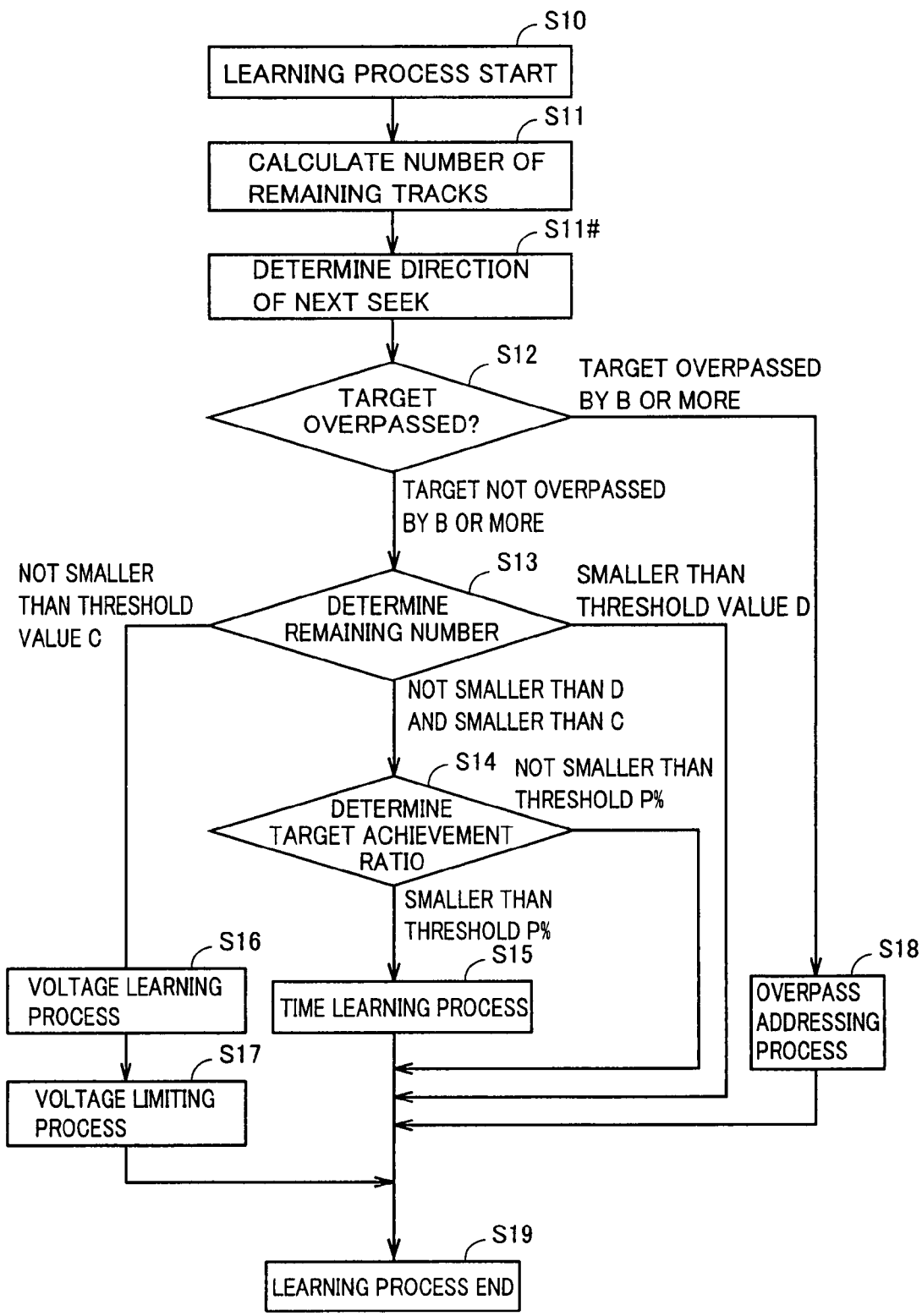

OPTICAL DISK DEVICE PERFORMING HIGH-SPEED SEEK OPERATION AND OPTICAL DISK DEVICE SEEKING METHOD

BACKGROUND OF THE INVENTION

1. Field of the Invention

The present invention relates to a seek operation of an optical disk device recording information on or reproducing information from an optical disk using an optical pick-up.

2. Description of the Background Art

Conventionally, an optical disk device has been known, which records and/or reproduces information on an optical disk having information tracks formed in concentric or spiral manner such as a CD or a DVD, using an optical head referred to as an optical pick-up. The optical pick-up is configured to emit a light beam such as a beam of a semiconductor laser to be focused through an objective lens on the optical disk, and to receive the light incident on and reflected from the optical disk to output a corresponding electric signal, and the optical pick-up moves along the radial direction of the optical disk.

The optical disk device moves the optical pick-up to a prescribed position on the optical disk, and while the optical disk rotates, light from the optical pick-up is directed and focused on a recording track of the optical disk, so that the information is recorded on and/or reproduced from the optical disk.

When information is to be reproduced from an optical disk, first, a focus-on operation (focusing) is done so that beams emitted from the optical pick-up meet on a position of an optical disk surface, and then a track-on operation (tracking) is done so that the focused light beam is positioned on a recording track. These focusing and tracking operations are realized by moving an objective lens in a direction perpendicular to the optical disk surface and a direction perpendicular to the recording track, in accordance with an electric signal output from the optical pick-up. From the electric signal output from the optical pick-up in the focused-on and tracked-on state, pits formed on the optical disk are read and the information thereof is reproduced. As to the recording of information on the optical disk, information is recorded by forming a pit or pits on the recording track of the optical disk by the light directed and focused from the optical head to the optical disk.

Prior to the reproduction and recording of information from/to the optical disk, a seek operation of moving the optical pick-up to a target track on the disk takes place.

The seek operation includes a coarse seek operation in which the optical pick-up is moved by a motor and accelerated in the direction to the target track for rough tracking around the target track as a temporal measure, followed by a fine seek operation in which the optical pick-up finely tracks the target track.

By way of example, Japanese Patent Laying-Open Nos. 08-124177, 2005-018873 and 2005-216332 propose various methods of the seek operation. A method of realizing highly accurate seek operation by controlling speed of the optical pick-up during a seek operation, for example, has been disclosed.

The method of controlling the speed of optical pick-up during a seek operation, however, involves real-time monitoring of the speed of traversing tracks and the number of traversed tracks and measurement of a difference between the target speed and the actual speed, and the motor is driven based on the result of measurement. Therefore, circuit structure becomes complicated, naturally resulting in high cost.

Further, as the speed of traversing tracks and the number of traversed tracks must be monitored during a seek operation, it is necessary to almost fully generate a tracking error signal, and hence, there is a limit on the driving speed of the motor.

Further, as it is necessary to attain track-on (tracking) during the seek operation, the tracking lens may shift while the optical pick-up is being moved by the motor, which may lead to lower sensitivity at the time of track-on (tracking), degradation of the tracking error signal or imbalanced tracking error signal, possibly resulting in a failure of track-on.

SUMMARY OF THE INVENTION

The present invention was made to solve the above-described problems, and its object is to provide an optical disk device allowing high-speed seek operation in a simple manner, as well as to provide a seek method.

According to an aspect, the present invention provides an optical disk device performing at least one of recording and reproduction of information by directing a laser beam to an optical disk, including: an optical pick-up, a motor responsive to an input voltage signal for moving the optical pick-up along a radial direction of the optical disk; and control means for controlling the motor. The control means controls a seek operation by calculating, during the seek operation, a seek tracking number as the number of tracks from current track to a target track, and adjusts at least one of voltage level and application time of the input voltage signal for next seeking, based on the number of remaining tracks as a difference between the target track position before seeking and the track position reached after seeking.

Preferably, the control means does not adjust the input voltage signal for the next seeking when the number of remaining tracks is smaller than a first threshold value, adjusts application time of the input voltage signal under a prescribed condition when the number of remaining tracks is not smaller than the first threshold value and smaller than a second threshold value, and adjusts the voltage level of the input voltage signal when the number of remaining tracks is not smaller than the second threshold value.

Particularly, the prescribed condition is that ratio of number of tracks from the current track position to the reached track position to the number of tracks sought in the seek operation is determined to be smaller than a prescribed ratio.

Preferably, the control means determines, in the seek operation, whether the optical pick-up overpassed the target track position or not, and when the pick-up overpassed by a prescribed number of tracks or more, adjusts the application time of the input voltage signal.

Preferably, the control means repeats the seek operation until the number of remaining tracks becomes smaller than a prescribed number, and when the number of remaining tracks becomes smaller than the prescribed number, executes the seek operation one track at a time or a plurality of tracks at a time.

According to another aspect, the present invention provides a method of seeking in an optical disk device performing at least one of recording and reproduction of information by directing a laser beam to an optical disk, wherein the optical disk device includes an optical pick-up, a motor responsive to an input voltage signal for moving the optical pick-up along a radial direction of the optical disk, and control means for controlling a seek operation by calculating, during the seek operation, a seek tracking number as the number of tracks from the current track to a target track, and adjusting at least one of voltage level and application time of the input voltage signal for the next seeking, based on the number of remaining tracks as a difference between the target track position before seeking and the track position reached after seeking. The method includes the steps of determining, in the seek operation, whether the optical pick-up overpassed the target track position or not; adjusting the application time of the input voltage signal if the pick-up overpassed by a prescribed number of tracks or more; not adjusting the input voltage signal for the next seek if the number of remaining tracks is smaller than a first threshold value, determining whether ratio of number of tracks from the current track position to the reached track position to the number of tracks sought in the seek operation is smaller than a prescribed ratio or not if the number of remaining tracks is not smaller than the first threshold value and smaller than a second threshold value, and adjusting the application time of the input voltage signal if the ratio is smaller than the prescribed ratio, and adjusting the voltage level of the input voltage signal if the number of remaining tracks is not smaller than the second threshold value; and repeating the seek operation until the number of remaining tracks becomes smaller than a prescribed number, and executing the seek operation one track at a time or a plurality of tracks at a time, if the number of remaining tracks becomes smaller than the prescribed number.

The optical disk device and the method of seeking of the optical disk device in accordance with the present invention include a control unit that controls a seek operation by calculating, at the time of a seek operation, the seek tracking number as the number of tracks from the present track position to the target track position, and controls at least one of voltage level and application time of an input voltage signal for the next seeking, based on the target track position before seeking, reached track position after seeking and the number of remaining tracks. Since at least one of the input voltage signal and the application time is adjusted by the control unit at the next seek operation, accuracy of the coarse seek operation improves, and therefore, a high-speed seek operation becomes possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flowchart representing a learning function in accordance with an embodiment of the present invention.

DESCRIPTION OF THE PREFERRED EMBODIMENTS

Figure 1:
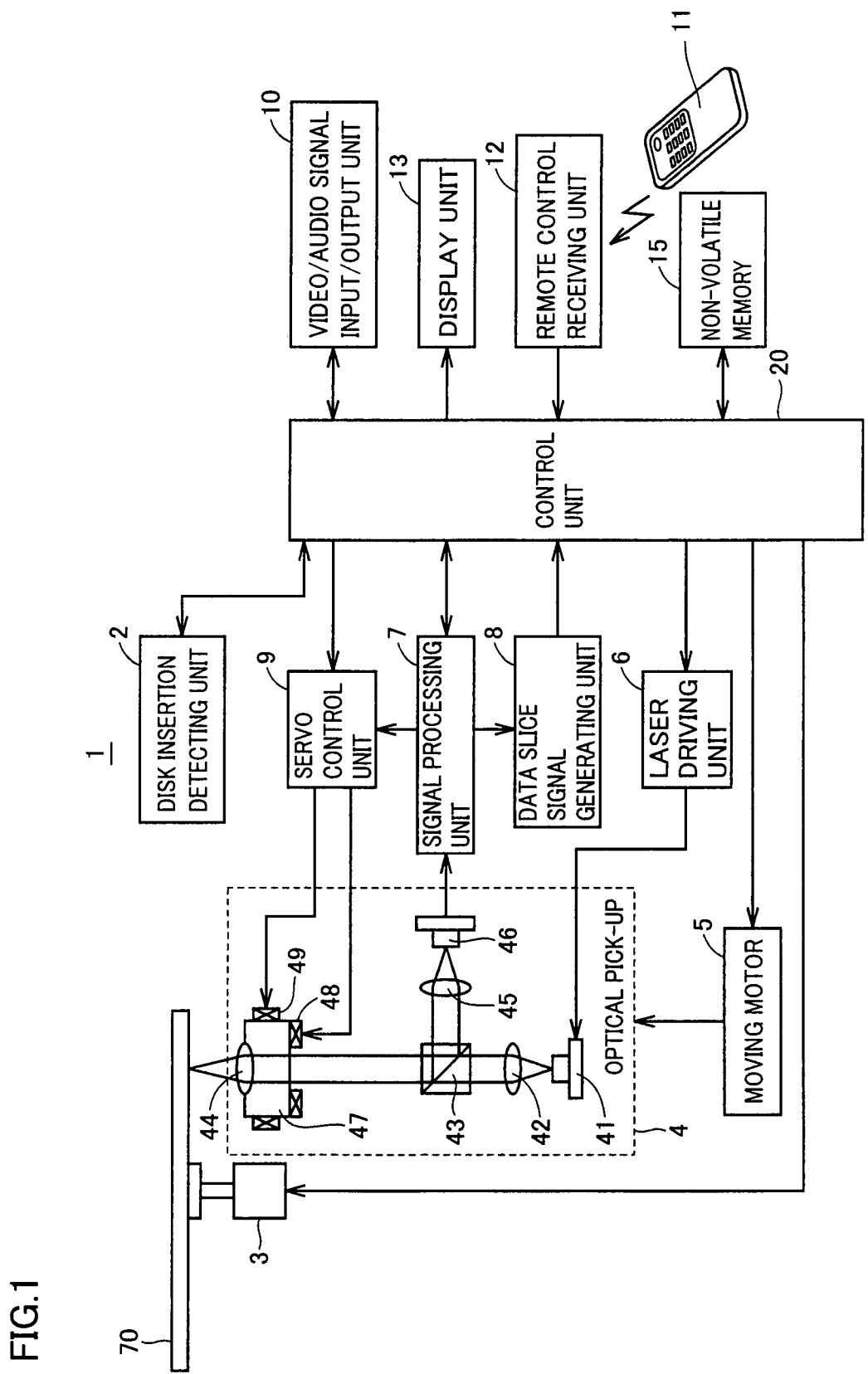
FIG. 1 is a schematic block diagram of an optical disk device in accordance with an embodiment of the present invention.

In the following, embodiments of the present invention will be described in detail with reference to the figures. Throughout the figures, the same or corresponding portions are denoted by the same reference characters and description thereof will not be repeated.

Referring to FIG. 1, an optical disk device 1 in accordance with the present invention records and/or reproduces information such as music or video images, on an optical disk 70 having concentric or spiral information recording tracks such as a CD or a DVD. In the present embodiment, the optical disk device is assumed to be an optical disk device capable of CD/DVD compatible recording/reproduction. Particularly, the optical disk described with respect to the present embodiment is assumed to be a CD storing, for example, music information.

Optical disk device 1 includes a disk insertion detecting unit 2, a spindle motor 3, an optical pick-up 4, a moving motor 5, a laser driving unit 6, a signal processing unit 7, a data slice signal generating unit 8, and a servo control unit (a focusing control unit, a tracking control unit) 9. Further, optical disk device 1 includes a video/audio signal input/output unit 10, a remote controller 11, a remote control receiving unit 12, a display unit 13, a non-volatile memory 15, and a control unit 20 for controlling these units.

Disk insertion detecting unit 2 detects that an optical disk is inserted from a disk inserting portion, not shown, and placed on a disk tray, and inputs a corresponding signal to control unit 20. An inserted optical disk 70 is mounted on spindle motor 3. Spindle motor 3 is driven and rotated in accordance with an instruction from control unit 20, and controls such that the loaded optical disk 70 rotates at a prescribed speed.

Optical pick-up 4 emits light to optical disk 70 for recording/reproducing information, and receives light reflected from optical disk 70 and converts the light to an electric signal to be output. Optical pick-up 4 is moved over and along the radial direction of optical disk 70, by moving motor 5 implemented by a linear motor, in accordance with an instruction from control unit 20.

Optical pick-up 4 collects and directs light emitted from a semiconductor laser 41 through a collimator lens 42, a beam splitter 43 and an objective lens 44 to optical disk 70. Further, light reflected from optical disk 70 is received by a photo detector 46 through objective lens 44, beam splitter 43 and a collective lens 45.

Semiconductor laser 41 has its light emission controlled by a laser driving unit 6 operating in response to an instruction from control unit 20. Photo detector 46 has a light receiving surface divided into a plurality of areas, and is formed of divided photo diodes outputting electric signals in accordance with the intensity of light received at respective divided light receiving surfaces. An output signal from photo detector 46 is input to signal processing unit 7.

Objective lens 44 is held in a lens holder 47, and lens holder 47 is provided with a focusing coil 48 and a tracking coil 49. Focusing coil 48 moves objective lens 44 in a direction perpendicular to the disk surface of optical disk 70 by a magnetic function with a magnet, not shown. Tracking coil 49 moves objective lens 44 in a direction perpendicular to recording tracks of optical disk 70 parallel to the disk surface of optical disk 70, in the similar manner.

Signal processing unit 7 generates an RF signal (reflection intensity) based on an output signal from photo detector 46, and outputs the generated signal to data slice signal generating unit 8. Data slice signal generating unit 8 generates a data slice signal by binarizing the RF signal, and inputs the signal to control unit 20. Control unit 20 detects a pit formed on optical disk 70, based on the data slice signal.

Further, signal processing unit 7 generates a focus error signal and a track error signal based on the output signal from photo detector 46, and outputs the signals to servo control unit 9. The focus error signal corresponds to an amount of deviation of the focusing point of light directed through objective lens 44 onto optical disk 70 from the optical disk surface, and the track error signal corresponds to an amount of deviation of the focusing point from a recording track.

Servo control unit 9 controls current supply to focusing coil 48 and tracking coil 49 based on the focus error signal and track error signal to move the objective lens 44, realizing servo control so that the point of focus is positioned on the disk surface of optical disk 70 and on the recording track.

To video/audio signal input/output unit 10, external devices such as a display, a speaker, a TV receiver or the like, not shown, are connected, whereby video or audio signals reproduced from optical disk 70 are output, or video or audio signals from an external device are input.

Remote controller 11 is to control various operations of optical disk device 1, and has operation keys (not shown) for controlling various operations. In response to an operation of these keys, remote controller 11 transmits a corresponding signal by infrared transmission. Remote control receiving unit 12 receives the infrared signal transmitted from remote controller 11, and outputs the signal to control unit 20. Display unit 13 is provided on a front panel of optical disk device 1, and displays contents of operation controlled by remote controller 11 or state of operation of optical disk device 1.

Here, recording/reproduction of information to/from optical disk 70 will be described. First, information is reproduced from optical disk 70 in the following manner. Optical disk 70 is rotated at a prescribed speed by spindle motor 3 while light from semiconductor laser 41 is directed to optical disk 70, and the reflected light is received by photo detector 46. By servo control unit 9, objective lens 44 is moved by controlling current supply to focusing coil 48 based on a focus error signal from signal processing unit 7, to attain "focus-on" (focusing), such that the point where light beams from semiconductor laser 41 are collected is positioned on the surface of optical disk 70. Further, by servo control unit 9, objective lens 44 is moved by controlling current supply to tracking coil 49 based on a track error signal from signal processing unit 7, to attain "track-on" (tracking), so that the point where light beams from semiconductor laser 41 are collected is positioned on a desired recording track.

After focus-on and track-on, servo control unit 9 controls current supply to focusing coil 48 and tracking coil 49 based on the focus error signal and track error signal, whereby focusing servo control and tracking servo control are exerted to maintain the focus-on state and track-on state.

In such a servo-controlled state, an RF signal output from signal processing unit 7 is input to a data slice signal generating unit 8, and a data slice signal generated by binarizing the RF signal by data slice signal generating unit 8 is input to control unit 20. Based on the data slice signal, control unit 20 detects presence/absence of a pit formed on optical disk 70 to read information recorded on optical disk 70, and the read information is reproduced as a video or audio signal and output through video/audio signal input/output unit 10 to an external device.

Further, information is recorded on optical disk 70 in the similar manner, by forming a pit on optical disk 70 using light from semiconductor laser 41, in the focusing and tracking servo state. Here, video signals or audio signals input to video/audio signal input/output unit 10 are encoded by control unit 20, and by control unit 20, light emission of semiconductor laser 41 is controlled in accordance with the encoded data. Consequently, pits in accordance with the encoded data are formed on the recording track of optical disk 70, and video or audio information is recorded. Formation of a pit is made possible by emitting laser beam of higher output than at the time of reading information, from semiconductor laser 41.

In the following, a seek operation of moving optical pick-up 4 to a target track on optical disk 70 prior to recording or reproduction of information to/from optical disk 70 in accordance with the present embodiment will be described.

In the seek operation in accordance with the present embodiment, a coarse seek operation in which optical pick-up 4 is moved by a moving motor and accelerated in a direction to a target track for tentative, rough tracking near the target track, and a subsequent fine seek operation in which precise tracking of a target track is attained, are executed.

Figure 2:
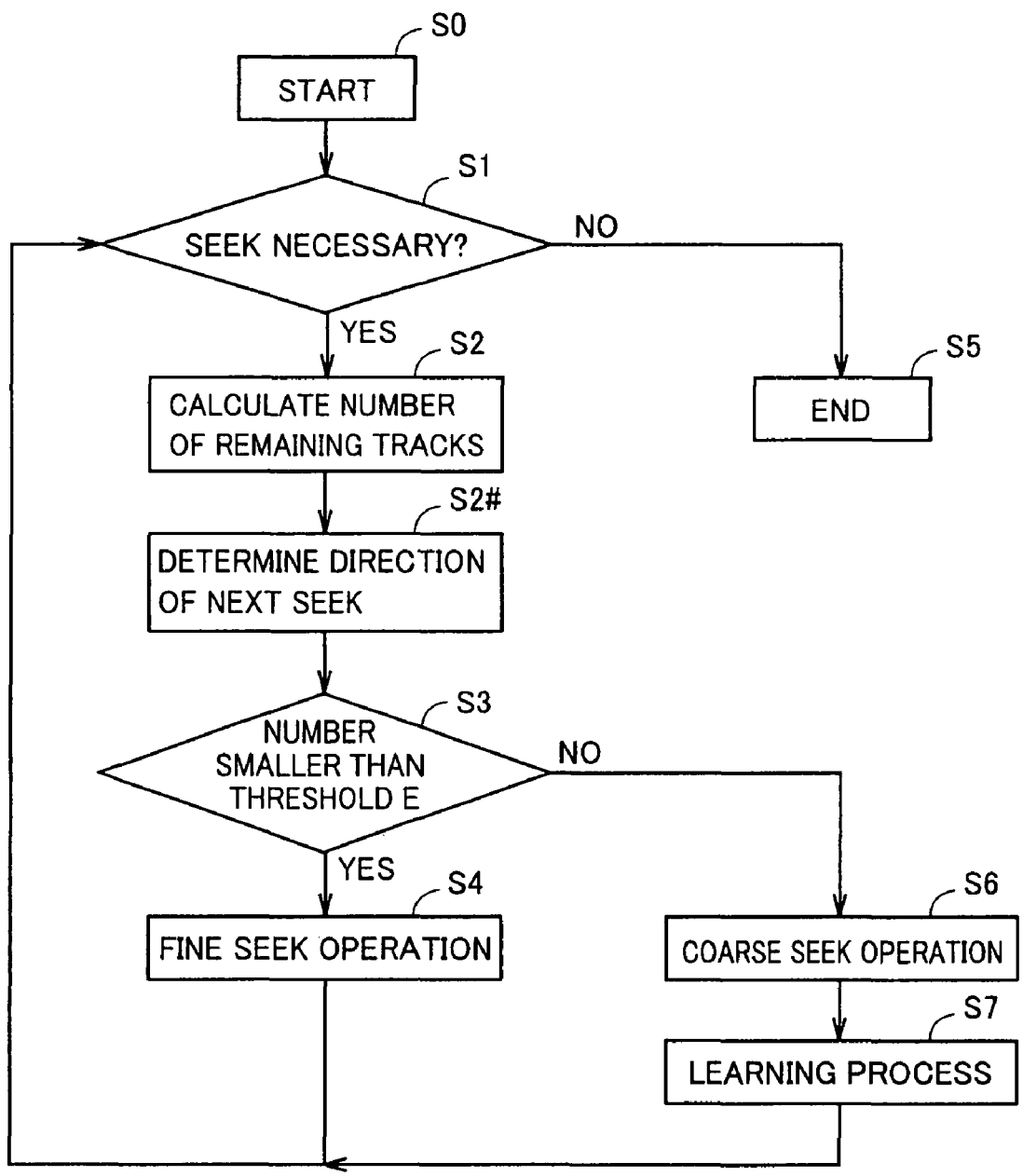
FIG. 2 is a flowchart for executing a seek operation in accordance with the embodiment of the present invention.

Using FIG. 2, a flowchart executing the seek operation in accordance with the embodiment of the present invention will be described. Referring to FIG. 2, first, optical disk 70 is loaded on a tray and the operation starts (START) (Step S0), and whether a seek operation is necessary or not is determined (step S1). Specifically, when "track-on" on the target track position has been attained, that is, when optical pick-up 4 has already been moved to the target track position, the seek operation has been complete, and therefore, the seek operation is terminated (step S5).

When the seek operation has not yet been complete at step S1, and "track-on" on the target track position has not yet been attained, it is determined that a seek operation is necessary, and the number of remaining tracks to reach the target track is calculated (step S2). Specifically, the number of seek tracking, that is, the number of tracks between the present track position and the target track position is calculated (step S2). Then, the direction of seek operation to be executed next is determined. Specifically, whether optical pick-up 4 is to be moved to the inner side or outer side along the radial direction of optical disk 70 is determined (step S2#).

Next, whether the number of seek tracking is smaller than a prescribed threshold value E or not is determined (step S3). If the seek tracking number is smaller than the prescribed threshold value E at step S3, the process proceeds to step S4, where the fine seek operation is executed.

Specifically, a seek operation in which optical pick-up 4 is moved to an address as the desired target track position through a so-called 1-track jump or a multi-jump is executed. Here, by way of example, it is assumed that the fine seek operation is executed when the seek tracking number is smaller than 250.

Then, the flow returns to step S1, and whether the seek operation is necessary or not is determined. If optical pick-up 4 has already been moved to the target track position, the flow proceeds to step S5 as described above. If a further seek operation is necessary, the flow proceeds to the next step S2, as described above.

If the seek tracking number is not smaller than the prescribed number E, the flow proceeds to step S6, where the coarse seek operation is executed (step S6).

Specifically, in order to move optical pick-up 4 to the vicinity of the target track, a constant voltage signal is applied to moving motor 5 for a prescribed time period defined by the seek tracking number, so that the optical pick-up is moved in the direction to the target track.

Next, a learning process of the coarse seek operation is executed (step S7), and the flow returns to step S1, to determine whether the seek operation is necessary or not. If optical pick-up 4 has already been moved to the address as the target track position, flow proceeds to step S5 as described above. If a further seek operation is necessary, the flow proceeds to the next step S2, as described above.

The target track position, the seek tracking number as the number of tracks to the present track position and the like related to the seek operation are calculated by control unit 20, which receives an output from signal processing unit 7 representing the result of processing of the information signal from optical disk 70. Based on the result of calculation, control unit 20 executes the seek operation of moving optical pick-up 4 to the target track position, by applying a prescribed constant voltage signal for a prescribed time period, by controlling moving motor 5.

Figure 3A:
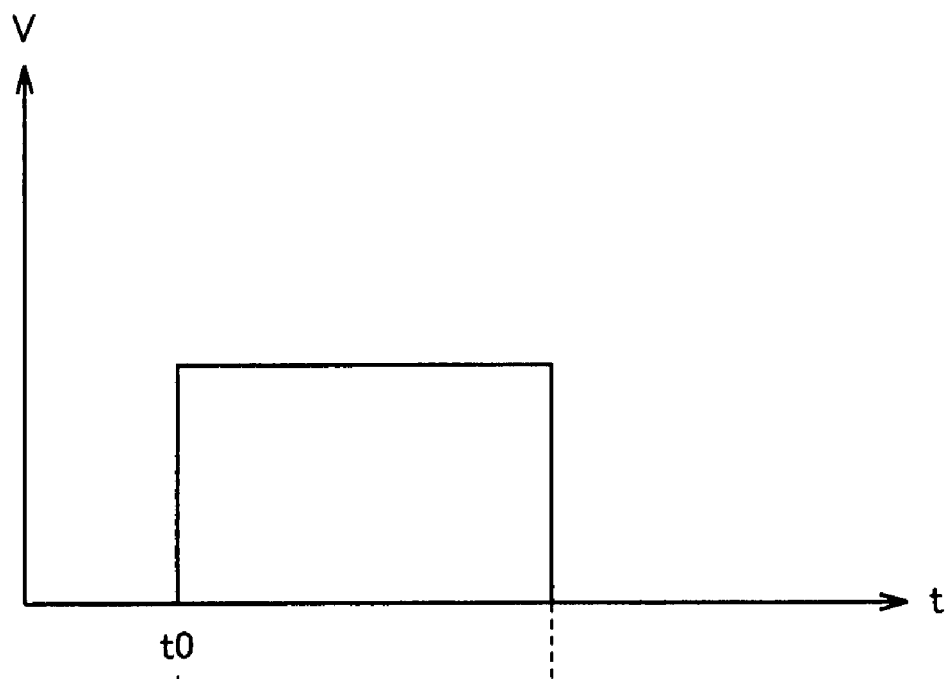
FIGS. 3A and 3B show waveforms of a constant voltage signal applied to a motor based on the number of tracks for seeking, when a coarse seek operation is executed.
Figure 3B:
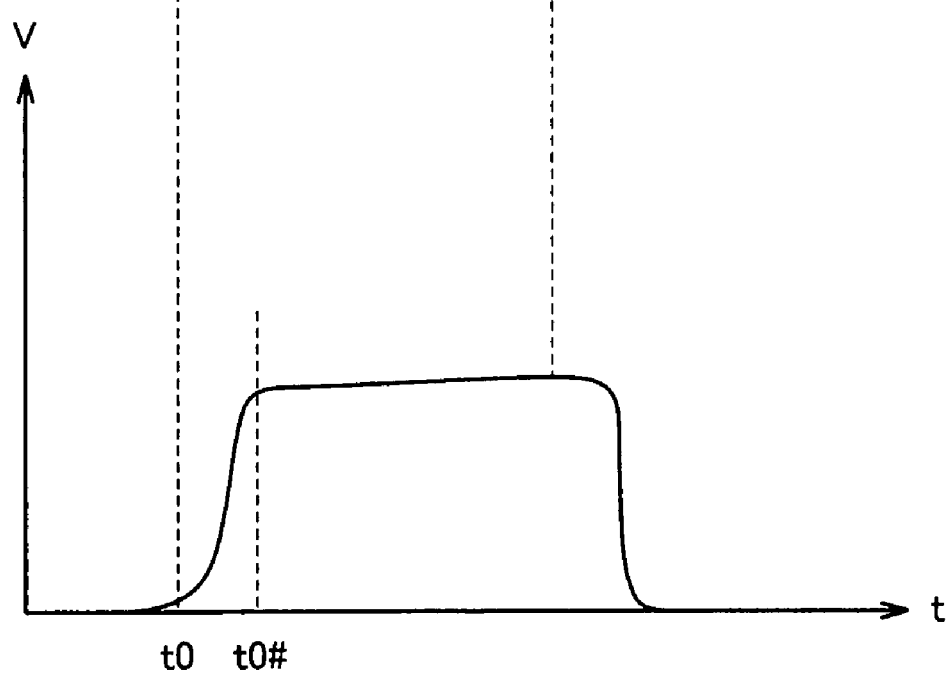

Referring to FIGS. 3A and 3B, waveforms of the constant voltage signal to be applied to the motor based on the seek tracking number when the coarse seek operation is executed, will be described.

FIG. 3A represents an ideal waveform of the constant voltage signal applied to the motor.

Though control unit 20 controls optical pick-up 4 such that the pick-up moves in the direction to the target track by applying the constant voltage signal to moving motor 5 for a prescribed time period based on the seek tracking number, the constant voltage signal actually applied to moving motor makes a transition at time t0# after a prescribed delay time from time t0, to the prescribed constant voltage signal, as shown in FIG. 3B. Specifically, when the ideal constant voltage signal is compared with the constant voltage signal actually applied to moving motor 5, disturbance and deviation are observed in the waveform. Further, dependent on frictional characteristics or motor characteristics, moving load on moving motor 5 may possibly differ.

Figure 4:
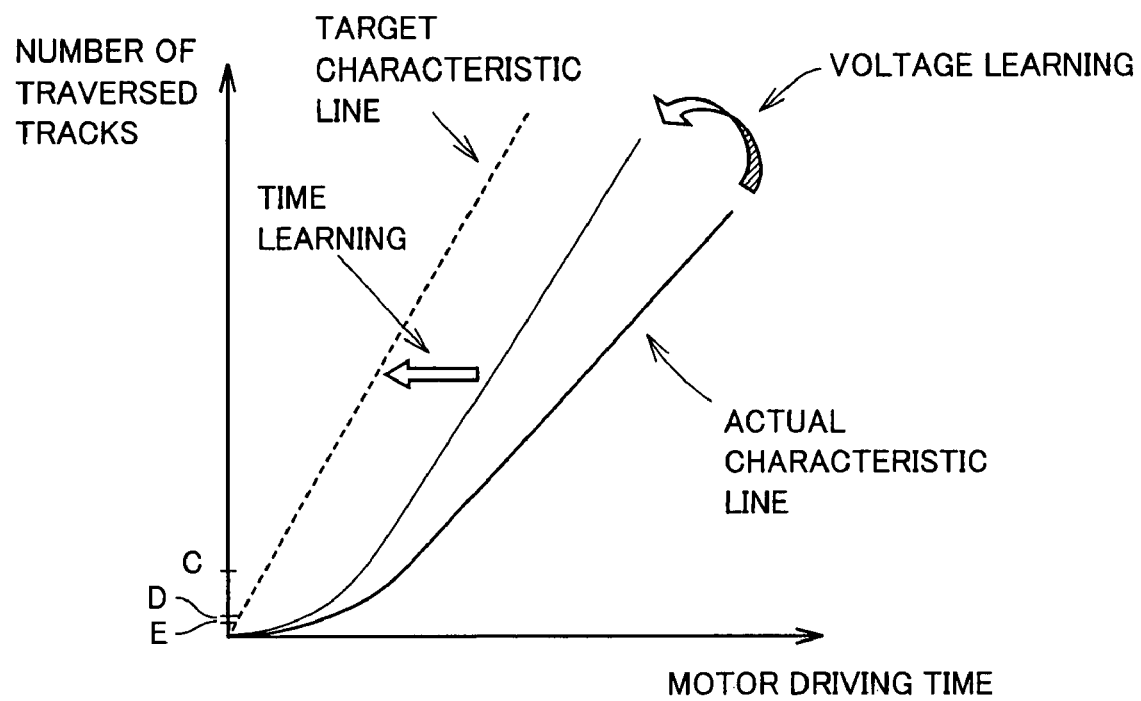
FIG. 4 is an illustration related to the number of traversed tracks, when a constant voltage is applied to a moving motor.

FIG. 4 illustrates the number of tracks traversed when the constant voltage is applied to the moving motor.

As can be seen from FIG. 4, it is expected that, in an ideal example not considering the disturbance and deviation in the waveform of the constant voltage or the moving load, a linear relation holds between the time of motor drive and the number of traversed tracks (target characteristic line).

Actually, however, the waveform of constant voltage signal applied to moving motor 5 has disturbance and deviation, and in addition, there is a moving load on the moving motor. Therefore, the rise of the actual characteristic line may be delayed, and the gradient might be slightly more moderate than the target characteristic line. Therefore, if the optical pick-up is moved with acceleration to the vicinity of the target track in the coarse seek operation, the position would significantly be deviated from the target position.

Therefore, in the present embodiment, a learning function is introduced to the coarse seek operation, and if the position deviates significantly from the target position, it is reflected on the next coarse seek operation so that the voltage level and the time of application of the constant voltage signal to be applied to moving motor 5 are adjusted, whereby a coarse seek operation of higher speed becomes possible.

Using FIG. 5, the flowchart related to the learning function in accordance with the embodiment of the present invention will be described.

Referring to FIG. 5, the learning process starts (step S10) and based on the track position reached at present and on the target track position, the number of remaining tracks is calculated (step S11).

Then, based on the track position reached at present and on the target track position, whether the number of remaining tracks represents overpass by at least a threshold value B or not is determined (target overpass determination) (step S12).

At step S12, if the target track position has been overpassed by the threshold value B or more, the flow proceeds to step S18, where a process to address the overpass is performed. Specifically, as the process to address overpass at step S18, a learning process is performed, to make shorter the time of application of the constant voltage by a prescribed time period than the last time of application in the next seek operation, or to set the voltage level of the applied constant voltage signal lower by a prescribed voltage level in the next seek operation. By way of example, if the target track position is passed by 50 remaining tracks or more, the process to address overpass is performed.

At step S12, if the target track position is not overpassed by the threshold value B or more, the flow proceeds to step S13, and the number of remaining tracks is determined (step S13).

At step S13, if the number of remaining tracks is smaller than a threshold value D, it is determined to be a normal coarse seek operation, and the learning process is not executed. By way of example, if the number of remaining tracks is smaller than 300, the flow proceeds to step S19.

At step S13, if the number of remaining tracks is not smaller than a threshold value C, it is determined to be an abnormal coarse seek operation, and the voltage learning process is executed (step S16). Specifically, the voltage level is adjusted to a level attained by adding a prescribed voltage to the voltage applied at the last seek operation. As the prescribed voltage, a voltage signal (voltage signal of high voltage level) is applied, which is obtained by multiplying a prescribed coefficient by the ratio of the remaining number for the present seek operation to the target number of the last operation. For example, when the remaining number of tracks is 2000 or more, the voltage learning process of step S16 is executed.

Then, the flow proceeds to the next step. At step S17, if the voltage level of the voltage signal to be applied has been set in the voltage learning process and the set voltage level is too high, a limit voltage level is set to prevent application of higher voltage signal (step S17). This surely prevents application of an excessively high voltage signal to moving motor 5.

Then, the learning process is terminated (END) (step S19).

If it is determined at step S13 that the remaining number of tracks is not smaller than the threshold value D and smaller than the threshold value C, and prescribed conditions are satisfied, the operation is determined to be abnormal, and a time learning function is executed. By way of example, when the number of tracks is not smaller than 300 and smaller than 2000, the flow proceeds to step S14.

Here, the ratio of the number of tracks sought from the last track position to the reached track with respect to the remaining number of tracks of the last time prior to the seek operation, is determined (determination of target achievement ratio) (step S14). Specifically, the ratio of achievement by the present seek operation to the target track position is determined.

If the target achievement ratio has reached a prescribed ratio (threshold value) P %, for example, if the target achievement ratio is 50% or more, it is determined that the coarse seek operation is normal, and the learning process is not executed.

On the contrary, if the target achievement ratio is determined to be lower than the prescribed ratio P %, for example, if it is determined to be lower than 50%, the coarse seek operation is determined to be abnormal, and the time learning process is executed (step S15). Specifically, in the next seek operation, a process is performed in which the time of applying the constant voltage signal is made longer by a prescribed time period than voltage application of the last seek operation.

Then, the learning operation is terminated (END) (step S19), and the flow again returns to step S1. The result of learning process is, for example, stored in a non-volatile memory 15, and when the next seek operation is executed, the result of learning process is reflected.

Therefore, in the coarse seek operation, if the gradient of the target characteristic line and of the actual characteristic line are much deviated as described with reference to FIG. 4, voltage learning is done and the voltage level of the constant voltage signal is increased so that the gradient is approximated to the gradient of the target characteristic line, and if there is much deviation in time between the target characteristic line and the actual characteristic line, time learning is done and the time of application of the constant voltage signal is adjusted, so that normal coarse seek operation, that is, coarse seek operation of sufficient accuracy can be executed.

In other words, by the learning process, in the coarse seek operation before entering the fine seek operation, high-speed seek operation becomes possible, and as a whole, the seek operation can be completed in a shorter time period.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk device performing at least one of recording and reproduction of information by directing a laser beam to an optical disk, comprising:
    an optical pick-up;
    a motor responsive to an input voltage signal for moving said optical pick-up along a radial direction of said optical disk; and
    control means for controlling said motor,
    wherein said control means controls a seek operation by calculating, during the seek operation, a seek tracking number as the number of tracks from current track to a target track, and adjusts at least one of voltage level and application time of the input voltage signal for next seeking, based on the number of remaining tracks as a difference between the target track position before seeking and the track position reached after seeking, and
    wherein said control means does not adjust the input voltage signal for next seeking when said number of remaining tracks is smaller than a first threshold value, adjusts application time of said input voltage signal under a prescribed condition when said number of remaining tracks is not smaller than the first threshold value and smaller than a second threshold value, and adjusts the voltage level of said input voltage signal when said number of remaining tracks is not smaller than said second threshold value.

2. The optical disk device according to claim 1, wherein said prescribed condition is that ratio of number of tracks from the current track position to the reached track position to the number of tracks sought in said seek operation is determined to be smaller than a prescribed ratio.

3. The optical disk device according to claim 1, wherein said control means determines, in said seek operation, whether said optical pick-up overpassed the target track position or not, and when the pick-up overpassed by a prescribed number of tracks or more, adjusts the application time of said input voltage signal.

4. An optical disk device performing at least one of recording and reproduction of information by directing a laser beam to an optical disk, comprising:
    an optical pick-up;
    a motor responsive to an input voltage signal for moving said optical pick-up along a radial direction of said optical disk; and
    control means for controlling said motor,
    wherein said control means controls a seek operation by calculating, during the seek operation, a seek tracking number as the number of tracks from current track to a target track, and adjusts at least one of voltage level and application time of the input voltage signal for next seeking, based on the number of remaining tracks as a difference between the target track position before seeking and the track position reached after seeking, and
    wherein said control means repeats said seek operation until said number of remaining tracks becomes smaller than a prescribed number, and when said number of remaining tracks becomes smaller than the prescribed number, executes the seek operation one track at a time or a plurality of tracks at a time.

5. A method of seeking in an optical disk device performing at least one of recording and reproduction of information by directing a laser beam to an optical disk, wherein said optical disk device includes an optical pick-up, a motor responsive to an input voltage signal for moving said optical pick-up along a radial direction of said optical disk, and control means for controlling a seek operation by calculating, during the seek operation, a seek tracking number as the number of tracks from current track to a target track, and adjusting at least one of voltage level and application time of the input voltage signal for next seeking, based on the number of remaining tracks as a difference between the target track position before seeking and the track position reached after seeking; said method comprising the steps of determining, in said seek operation, whether said optical pick-up overpassed the target track position or not; adjusting the application time of said input voltage signal if the pick-up overpassed by a prescribed number of tracks or more; not adjusting the input voltage signal for the next seek if said number of remaining tracks is smaller than a first threshold value, determining whether ratio of number of tracks from the current track position to the reached track position to the number of tracks sought in said seek operation is smaller than a prescribed ratio or not if said number of remaining tracks is not smaller than the first threshold value and smaller than a second threshold value, and adjusting the application time of said input voltage signal if the ratio is smaller than the prescribed ratio, and adjusting the voltage level of said input voltage signal if said number of remaining tracks is not smaller than said second threshold value; and repeating said seek operation until said number of remaining tracks becomes smaller than a prescribed number, and executing the seek operation one track at a time or a plurality of tracks at a time, if said number of remaining tracks becomes smaller than said prescribed number.

* * * * *